(12) United States Patent
Katar et al.

(10) Patent No.: US 9,154,312 B2
(45) Date of Patent: Oct. 6, 2015

(54) POWER SAVE PROXY IN COMMUNICATION NETWORKS

(75) Inventors: Srinivas Katar, Gainesville, FL (US);
Lawrence W. Yonge, III, Summerfield, FL (US); Manjunath Anandarama Krishnam, Gainesville, FL (US)

(73) Assignee: QUALCOMM Incorporated, San Diego, CA (US)

( * ) Notice: Subject to any disclaimer, the term of this patent is extended or adjusted under 35 U.S.C. 154(b) by 608 days.

(21) Appl. No.: 13/335,497

(22) Filed: Dec. 22, 2011

(65) Prior Publication Data
US 2013/0024706 A1 Jan. 24, 2013

Related U.S. Application Data

(60) Provisional application No. 61/509,876, filed on Jul. 20, 2011.

(51) Int. Cl.
*G06F 1/00* (2006.01)
*H04L 12/12* (2006.01)
(Continued)

(52) U.S. Cl.
CPC *H04L 12/12* (2013.01); *G06F 1/26* (2013.01); *G06F 1/3203* (2013.01); *Y02B 60/32* (2013.01); *Y02B 60/34* (2013.01); *Y02B 60/35* (2013.01); *Y02B 60/41* (2013.01)

(58) Field of Classification Search
CPC .......... G06F 1/3203; G06F 1/26; H04L 12/12
USPC ........................................................ 713/323
See application file for complete search history.

(56) References Cited

U.S. PATENT DOCUMENTS

2003/0152041 A1* 8/2003 Herrmann et al. ............ 370/310
2004/0128310 A1 7/2004 Zmudzinski et al.
(Continued)

FOREIGN PATENT DOCUMENTS

| JP | 2005080287 | 3/2005 |
| JP | 2007096898 | 4/2007 |
| WO | 2013013198 | 1/2013 |

OTHER PUBLICATIONS

International Search Report and Written Opinion—PCT/US2012/047714—ISA/EPO—Oct. 25, 2012.
(Continued)

*Primary Examiner* — Jaweed A Abbaszadeh
*Assistant Examiner* — Austin Hicks
(74) *Attorney, Agent, or Firm* — DeLizio Law, PLLC

(57) ABSTRACT

Power save proxy functionality can be implemented to enable power save devices to switch to a power save mode and still receive communications from legacy communication devices. A first communication device determines that a second communication device is in a power save mode. The first communication device designates itself as a power save proxy for the second communication device that is in the power save mode. In response to detecting packets that are transmitted from a legacy communication device to the second communication device, the first communication device transmits a control message to the second communication device to request the second communication device to exit the power save mode, transmits a hold control message to the legacy communication device to request the legacy communication device to temporarily stop transmitting packets to the second communication device, or stores the packets intended for the second communication device.

41 Claims, 7 Drawing Sheets

(51) Int. Cl.
  *G06F 1/32* (2006.01)
  *G06F 1/26* (2006.01)

(56) References Cited

U.S. PATENT DOCUMENTS

| | | | |
|---|---|---|---|
| 2004/0225892 A1* | 11/2004 | Bear et al. | 713/200 |
| 2005/0044430 A1 | 2/2005 | Cheshire | |
| 2006/0101109 A1* | 5/2006 | Nishio | 709/200 |
| 2006/0248364 A1* | 11/2006 | Gutman et al. | 713/300 |
| 2007/0078959 A1 | 4/2007 | Ye | |
| 2007/0124440 A1* | 5/2007 | Maki | 709/223 |
| 2010/0203905 A1* | 8/2010 | Chaubey et al. | 455/458 |
| 2010/0235668 A1* | 9/2010 | Cheshire | 713/323 |
| 2010/0315997 A1* | 12/2010 | Kim | 370/328 |

OTHER PUBLICATIONS

Co-pending U.S. Appl. No. 61/509,876, filed Jul. 20, 2011, pp. 16.
"PCT Application No. PCT/US12/47714 International Preliminary Report on Patentability", Sep. 12, 2013, 9 pages.
"Japanese Patent Application No. 2014-521845 Office Action", Mar. 3, 2015, 8 pages.

* cited by examiner

POWER SAVE PROXY IN COMMUNICATION NETWORKS

RELATED APPLICATION

This application claims the priority benefit of U.S. Provisional Application Ser. No. 61/509,876 filed on Jul. 20, 2011.

BACKGROUND

Embodiments of the inventive subject matter generally relate to the field of communication systems and, more particularly, a power save proxy in a communication network.

Communication devices typically implement power saving mechanisms by operating in a power save mode to conserve power and to reduce energy consumption. In the power save mode, the communication device can periodically transition between an awake sub-state and a sleep sub-state. The communication device can temporarily suspend transmission and reception of packets, thus reducing the average power consumption associated with the communication device. The duration of the awake sub-state and the sleep sub-state in the power save mode can influence the amount of power that can be saved at the communication device.

SUMMARY

Various embodiments of a power save proxy or a power save bridge proxy in a communication network are disclosed. In one embodiment, a first communication device determines that a second communication device of a communication network is in a power save mode. The first communication device determines to designate the first communication device as a power save proxy for the second communication device while the second communication device is in the power save mode. The first communication device detects one or more packets that are transmitted from a legacy communication device of the communication network to the second communication device while the second communication device is in the power save mode. The first communication device transmits a control message to the second communication device to request the second communication device to exit the power save mode to allow the second communication device to receive the one or more packets, in response to detecting the one or more packets that are transmitted from the legacy communication device to the second communication device while the second communication device is in the power save mode. Other embodiments of a power save proxy or a power save bridge proxy for communication networks are described below.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

Figure 1:
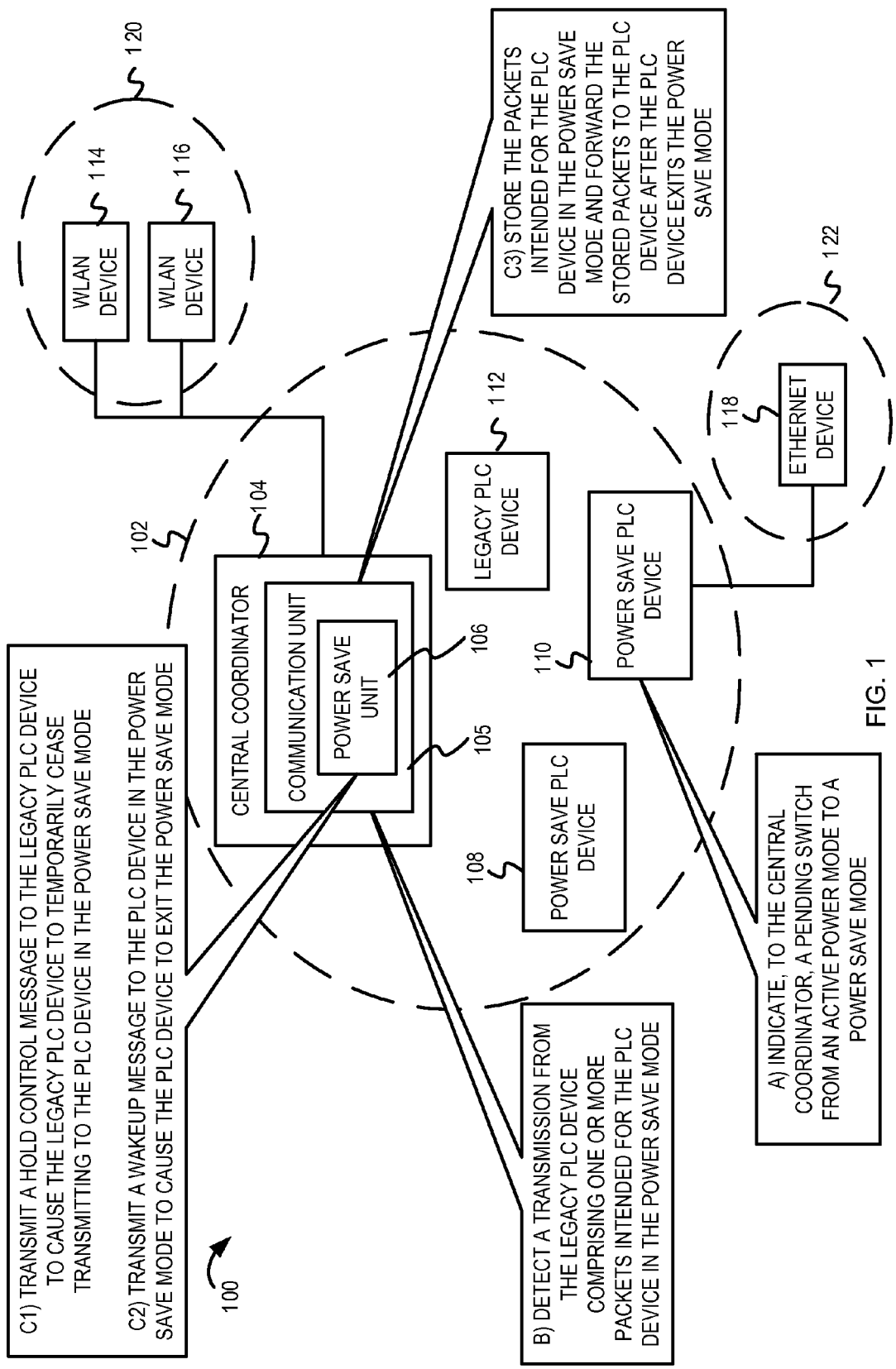
FIG. 1 is a conceptual diagram illustrating operations of a power save proxy bridge in a hybrid communication network.

The description that follows includes exemplary systems, methods, techniques, instruction sequences, and computer program products that embody techniques of the present inventive subject matter. However, it is understood that the described embodiments may be practiced without these specific details. For instance, although examples depict the power save proxy (and proxy bridge) functionality being executed by a powerline communication (PLC) device, embodiments are not so limited. In other embodiments, other suitable devices and standards (e.g., wireless local area network (WLAN) devices such as IEEE 802.11n devices, Ethernet devices, WiMAX, etc. can implement the operations described herein. In other instances, well-known instruction instances, protocols, structures, and techniques have not been shown in detail in order not to obfuscate the description.

A communication device typically operates in an active power state where the communication device can communicate with one or more other communication devices ("active power mode") in a network. However, to conserve power, the communication device can switch from the active power mode to a power save mode. In the power save mode, the communication device can be configured to alternate between an active/awake sub-state (for transmitting messages to maintain communication link connectivity, for synchronization, for scanning for received messages, etc.) and an inactive/sleep sub-state (where power to processing components of the communication device is minimized or disconnected). When the communication device switches to the power save mode, the communication device may only receive transmissions (e.g., from other communication devices) during the awake sub-state. Therefore, for proper/reliable communication, the communication device can indicate (e.g., to the other communication devices), the time intervals during which the communication device will be in the awake sub-state or in the active power mode. However, a communication network typically comprises a combination of communication devices that recognize/support the power save operating mode (referred to herein as "power save communication devices") and communication devices that do not recognize/support the power save operating mode (referred to herein as "legacy communication devices"). Unlike the power save communication devices, the legacy communication devices may not support the power save mode, may be incapable of switching to the power save mode, and/or may not have the ability to detect/process power save schedule messages. Therefore, the legacy communication devices may not be aware of when and for how long the power save communication devices will remain in the power save mode and may attempt to communicate with the power save communication devices when the power save communication devices are in the power save mode. This can cause transmissions from the legacy communication devices to fail, resulting in unreliable (or failure of) communication links between the legacy communication devices and the power save communication devices.

In some embodiments, a power save communication device can implement a power save proxy mechanism to enable other power save communication devices in the communication network to switch to the power save mode without affecting their ability to communicate with legacy network devices. In response to determining that a power save communication device will enter the power save mode, another power save communication device can be designated as a power save proxy for the power save communication device in the power save mode. In some embodiments, a power save communication device can also implement a power save proxy bridge mechanism to enable other power save communication devices in the communication network to enter the power save mode without affecting communication between the legacy network device and other network devices ("external bridged network devices") bridged by the power save communication device ("bridge device") in the power save mode. In response to determining that the bridge device will enter the power save mode, the power save communication device designated as the power save proxy bridge can notify other network devices that it is the power save proxy bridge to the external bridged network devices. The power save proxy (or the power save proxy bridge) can monitor transmissions from legacy network devices and can determine whether the transmissions from the legacy network devices are intended for the power save communication device in the power save mode (or for the external bridged network devices). If so, the power save proxy (or the power save proxy bridge) can A) temporarily store packets intended for the power save communication device in the power save mode and forward packets after the power save communication device exits the power save mode, B) prompt the power save communication device to exit the power save mode, and/or C) prompt the legacy network to temporarily stop transmitting to the power save communication device in the power save mode, as will be further described below with reference to FIGS. 1-7. The power save proxy mechanism can ensure that the communication link between legacy communication devices and the power save communication device is maintained even when the power save communication device is in the power save mode. The power save proxy bridge mechanism can ensure that the communication link between the legacy network devices and the external bridged network devices is maintained even when the bridge device is in the power save mode.

FIG. 1 is a conceptual diagram illustrating operations of a power save proxy bridge in a hybrid communication network 100. The hybrid communication network 100 comprises a powerline network 102. The powerline network 102 is coupled with a wireless local area network (WLAN) 120 and Ethernet 122. The powerline network 102 comprises a central coordinator 104, power save powerline communication (PLC) devices 108 and 110, and a legacy PLC device 112. The central coordinator 104 comprises a communication unit 105. The communication unit 105 comprises a power save unit 106. In some embodiments, in addition to PLC protocols, the communication unit 105 can implement other protocols and functionality to enable other types of communications (e.g., Bluetooth®, Ethernet, WiMAX, WLAN, etc.). The power save unit 106 can be configured to execute power save proxy functionality and/or power save proxy bridge functionality described herein. It is noted that although not depicted in FIG. 1, in some implementations, the power save PLC devices 108 and 110 may also comprise their respective communication units and power save units (as depicted with reference to the central coordinator 104 of FIG. 1). In some implementations, the central coordinator 104 can be a power save PLC device configured as a master coordinating device for the powerline network 102. In some implementations, the powerline network 102 may be a HomePlug® AV network, the power save PLC devices 104, 108, 110 may be HomePlug AV devices, and the legacy PLC device may be a HomePlug 1.0 device. The WLAN 120 comprises WLAN devices 114 and 116. The Ethernet network 122 comprises an Ethernet device 118. In FIG. 1, the central coordinator 104 couples the powerline network 102 to the WLAN 120. In other words, the central coordinator 104 is a WLAN bridge (also referred to as a "network bridge" or "bridge") between the powerline network 102 and the WLAN 120. Likewise, the power save PLC device 110 is an Ethernet bridge between the powerline network 102 and the Ethernet 122. In some implementations, the PLC devices 104, 108, 110, and 112 can each be electronic devices (e.g., laptop computer, a tablet computer, a smart appliance, a gaming console, an access point, or other suitable electronic devices) with PLC capabilities. Furthermore, the Ethernet device 118 can be a suitable electronic device with Ethernet communication capabilities. Also, the WLAN devices 114 and 116 can each be electronic devices (e.g., laptop computer, a tablet computer, a mobile phone, a smart appliance, a gaming console, an access point, a camera, or other suitable electronic devices) with wireless communication capabilities (e.g., IEEE 802.11a/b/g/n compatible devices).

As described above the central coordinator 104 and the power save PLC devices 108 and 110 may support the power save operating mode. In other words, the PLC devices 104, 108, and 110 may be capable of switching to/from the power save mode, detecting power save schedule messages (that indicate when and for how long another PLC device will switch to the power save mode), etc. Furthermore, as described above, the legacy PLC device 112 may not support the power save mode. In other words, the legacy PLC device 112 may not be aware of the power save mode, may be incapable of switching to the power save mode, and may not have the ability to detect/process the power save schedule messages. The legacy PLC device 112 may transmit packets to a power save PLC device configured in the sleep sub-state of the power save mode, resulting in unsuccessful (or failed) communication between the two PLC devices. As will further be described below in stages A-C3, functionality can be implemented for coordinating communication between the legacy PLC device 112 and the power save PLC device 110 configured in the power save mode.

At stage A, the power save PLC device 110 determines to switch from an active power mode to a power save mode. The power save PLC device 110 indicates, to the central coordinator 104, a pending switch from the active power mode to the power save mode. When configured in the power save mode, the power save PLC device 110 can periodically alternate between the active/awake sub-state (e.g., for transmitting control messages, for listening for messages, etc.) and the inactive/sleep sub-state. The time interval for which the power save PLC device 110 remains in the awake sub-state ("awake duration") and the duration for which power save PLC device 110 remains in the sleep sub-state ("sleep duration") can determine the amount of power that can be saved at the power save PLC device 110. The awake duration and the sleep duration can vary depending on the type of communication, priority of communication, and other such factors. Typically, each of the power save PLC devices can configure their respective awake sub-states and sleep sub-states differently and therefore, different power save PLC devices may be in the awake sub-state or the sleep sub-state for different lengths of time (e.g., based on power save requirements, application requirements, etc.). In some implementations, prior to switching to the power save mode, the power save PLC device 110 can indicate its device identifier, awake duration, and sleep duration to the central coordinator 104 (or another suitable master communication device). In some implementations, the power save PLC device 110 can also indicate a time instant at which (or a time interval after which) the power save PLC device 110 will switch to the power save mode. For example, the power save PLC device 110 can indicate that it will enter the power save mode after 100 milliseconds (or at time instant 13:05:20). In some implementations, the power save PLC device 110 can also indicate a time instant at which (or a time interval after which) it will exit the power save mode and switch to the active power mode. For example, the power save PLC device 110 can indicate that the power save PLC device 110 will exit the power save mode after 60 seconds (or at time instant 13:06:20).

After receiving an indication that the power save PLC device 110 will switch to the power save mode, the central coordinator 104 (e.g., the power save unit 106 of the central coordinator 104) can determine a power save schedule comprising the awake duration and the sleep duration associated with the power save PLC device 110 (and other power save PLC devices) that will switch to the power save mode. The central coordinator 104 can broadcast the power save schedule in a power save schedule message to all the other power save PLC devices 108 (of the powerline network 102) that will remain in the active power mode. The power save schedule message can be a beacon message, a management message, or another suitable message. After receiving an indication that the power save PLC device 110 will enter the power save mode, the central coordinator 104 can operate as a power save proxy or as a power save proxy bridge for the power save PLC device 110 depending on whether the power save PLC device 110 was a network bridge to one or more external network devices. When configured as a power save proxy, the central coordinator 104 can act as an intermediary between the power save PLC device 110 in the power save mode and the legacy PLC device 112 to ensure that communications between the power save PLC device 110 and the legacy PLC device 112 are not disrupted even when the power save PLC device 110 is in the power save mode, as will be further described in below and in FIGS. 2-3. When configured as a power save proxy bridge, the central coordinator 104 may transmit a notification to other PLC devices 108 and 112 in the powerline network 102 identifying the power save PLC device 110 that will enter the power save mode. With reference to FIG. 1, the power save PLC device 110 is a bridge to the Ethernet network 122 and the constituent Ethernet device 118. The central coordinator 104 can also indicate that while the power save PLC device 110 is in the power save mode, the central coordinator 104 will act as a power save proxy bridge to the Ethernet network 122 and the constituent Ethernet device 118, and that any packets intended for the Ethernet device 118 should be transmitted to the central coordinator 104.

At stage B, the communication unit 105 detects a transmission from the legacy PLC device 112 comprising one or more packets intended for the power save PLC device 110 in the power save mode. The central coordinator 104 can continuously monitor the transmissions from the legacy PLC devices and can determine whether any of the transmissions are intended for the power save PLC device 110 in the power save mode. In some implementations, the legacy PLC device 112 can initiate a unicast transmission comprising one or more unicast control/data packets intended for the power save PLC device 110. In another implementation, the legacy PLC device 112 can initiate a broadcast or a multicast transmission comprising one or more broadcast/multicast packets intended for multiple PLC devices (including the power save PLC device 110 in the power save mode). In response to detecting a transmission from the legacy PLC device 112, the central coordinator 104 can read one or more header fields associated with a packet(s) that constitute the transmission. Based on the content of the one or more header fields, the central coordinator 104 can determine the destination of the packets. If the central coordinator 104 determines that the packets intended for the power save PLC device 110, the central coordinator 104 (e.g., the power save unit 106) can 1) prompt the legacy PLC device 112 to temporarily stop transmitting packets to the power save PLC device 110 (described in stage C1), 2) prompt the power save PLC device 110 to exit the power save mode (described in stage C2), and/or 3) store the packets while the power save PLC device 110 is in the power save mode and forward the stored packets to the power save PLC device 110 after the power save PLC device 110 exits the power save mode (described in stage C3). Additionally, in some implementations, the central coordinator 104 may also receive (e.g., from the legacy PLC device 112, from a WLAN device 114 bridged by the central coordinator 104, from another power save PLC device 108, etc.) one or more packets intended for the Ethernet device 118 to which the central coordinator 104 is the power save proxy bridge. The power save unit 106 can execute one or more of the operations described below in stages C1, C2, and C3, in response to receiving packets intended for the Ethernet device 118 while the Ethernet bridge (i.e., the power save PLC device 110) is in the power save mode.

At stage C1, the power save unit 106 transmits a hold control message to the legacy PLC device 112 to cause the legacy PLC device 112 to temporarily cease transmitting to the power save PLC device 110 in the power save mode. The hold control message can indicate that the legacy PLC device 112 should stop transmitting packets to the power save PLC device 110 for at least a hold time interval. As will be further described with reference to FIGS. 2-3, the hold time interval can be determined so that the transmissions (or re-transmissions) of the legacy PLC device 112 to the power save PLC device 110 occur when the power save PLC device 110 is in the awake sub-state of the power save mode or after the power save PLC device 110 switches to the active power mode. In other implementations, the power save unit 106 can continuously transmit one or more hold control messages to the legacy PLC device 112 for as long as the power save PLC device 110 is in the power save mode.

At stage C2, the power save unit 106 transmits a wakeup control message to the power save PLC device 110 in the power save mode to cause the power save PLC device 110 to exit the power save mode. The power save unit 106 may also determine whether to prompt the power save PLC device 110 to exit the power save mode. As will be described below in FIGS. 2-3, the power save unit 106 can transmit the wakeup control message to notify the power save PLC device 110 to switch to the active power mode and receive the packets transmitted by the legacy PLC device 112.

At stage C3, the power save unit 106 stores the packets intended for the power save PLC device 110 in the power save mode in response to determining (at stage B) that the one or more packets from the legacy PLC device 112 are intended for the power save PLC device 110 in the power save mode. In some implementations, the central coordinator 104 can store all of the packets intended for the power save PLC device 110. In another implementation, the central coordinator 104 may store only a subset of the packets intended for the PLC device 110 (e.g., depending on the priority of the incoming packets, the priority of the legacy PLC device that transmitted the packets, available storage at the central coordinator 104, etc.). At stage C3, the power save unit 106 also forwards the stored packets to the power save PLC device 110 after the power save PLC device 110 exits the power save mode (or after the power save PLC device exits the sleep sub-state of the power save mode). In some implementations, the power save unit 106 can receive a notification (e.g., from the power save PLC device 110) after the power save PLC device 110 exits the power save mode. In another implementation, the power save unit 106 can automatically determine when the power save device 110 will exit the power save mode (e.g., based on a power save schedule associated with the power save PLC device 110). After the power save PLC device 110 exits the power save mode, the power save unit 106 can notify the power save PLC device 110 that one or more packets intended for the power save PLC device 110 are available at the central coordinator 104. The central coordinator 104 can then forward the stored packets to the power save PLC device 110. The operations described above in stage C3 can enable the power save PLC device 110 to receive transmissions from and maintain the communication link with the legacy PLC device 112 even when the power save PLC device 110 is in the power save mode.

It is noted that in some implementations, the central coordinator 104 may be configured to always operate in the active power save mode and to not switch to the power save mode. The central coordinator 104 may be the default power save proxy and the power save proxy bridge for all the power save PLC devices 108 and 110 in the powerline network 102. In other implementations, however, any suitable power save PLC device can be designated as the power save proxy and/or the power save proxy bridge. The power save PLC device designated as the power save proxy may not switch to the power save mode at least for the duration that it is designated as the power save proxy. Instead, the power save proxy may continuously monitor transmissions from the legacy PLC devices. In response to detecting a transmission intended for a power save PLC device in the power save mode, the power save proxy can execute appropriate functionality described above in stages C1, C2, and/or C3 of FIG. 1.

It is noted that although FIG. 1 depicts the powerline network 102 being coupled with the WLAN 120 and the Ethernet 122, embodiments are not so limited. In other embodiments, the powerline network 102 may be coupled with any suitable number and type of communication networks. Furthermore, in some implementations, different power save communication devices may act as network bridges to different devices (or different subsets of devices) within the same communication network. For example, in some implementations, although the WLAN devices 114 and 116 belong to the same WLAN 120, a first power save PLC device (e.g., the central coordinator 104) may act as a bridge to the WLAN device 114 and a second power save PLC device (e.g., the power save PLC device 108) may act as a bridge to the WLAN device 116. It is also noted that in some implementations, the power save PLC devices 104, 108, and 110 can be HomePlug AV devices. In other implementations, the power save PLC devices 104, 108, and 110 can be other suitable types of PLC devices (e.g., HomePlug AV2 devices, HomePlug Green PHY devices, or a combination of two or more different types of power save HomePlug devices). Additionally, in some implementations, the bridged networks 120 and 122 can be other suitable types of communication networks such as Ethernet, WLAN (e.g., 802.11n network), WiMAX networks, other PLC networks, hybrid networks, etc. Furthermore, in some implementations, other suitable devices/standards (e.g., WLAN, WiMAX, etc.) can implement the power save proxy functionality and the power save proxy bridge functionality described herein.

Figure 2:
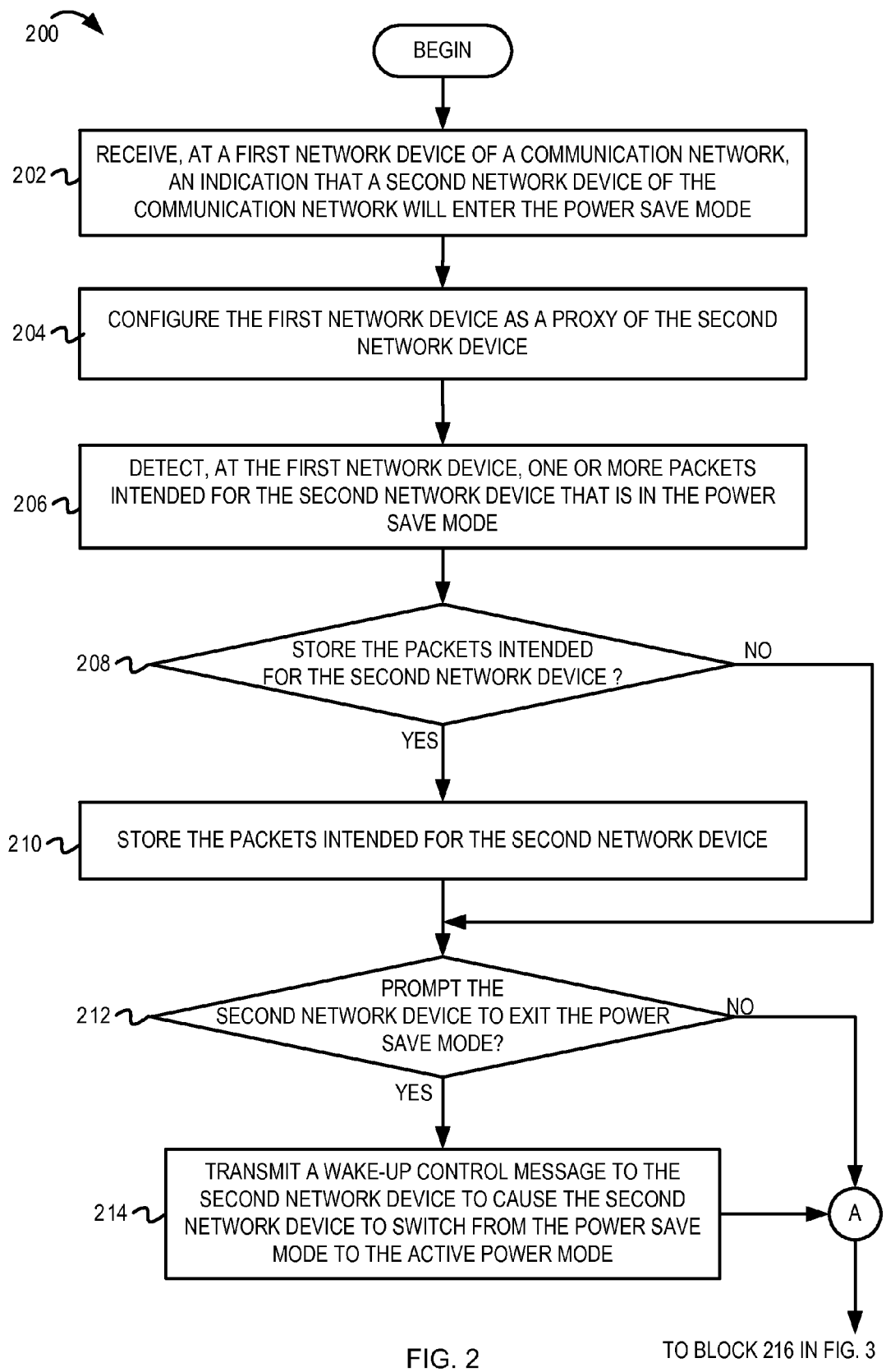
FIG. 2 is a flow diagram illustrating example operations of a power save proxy device.
Figure 3:
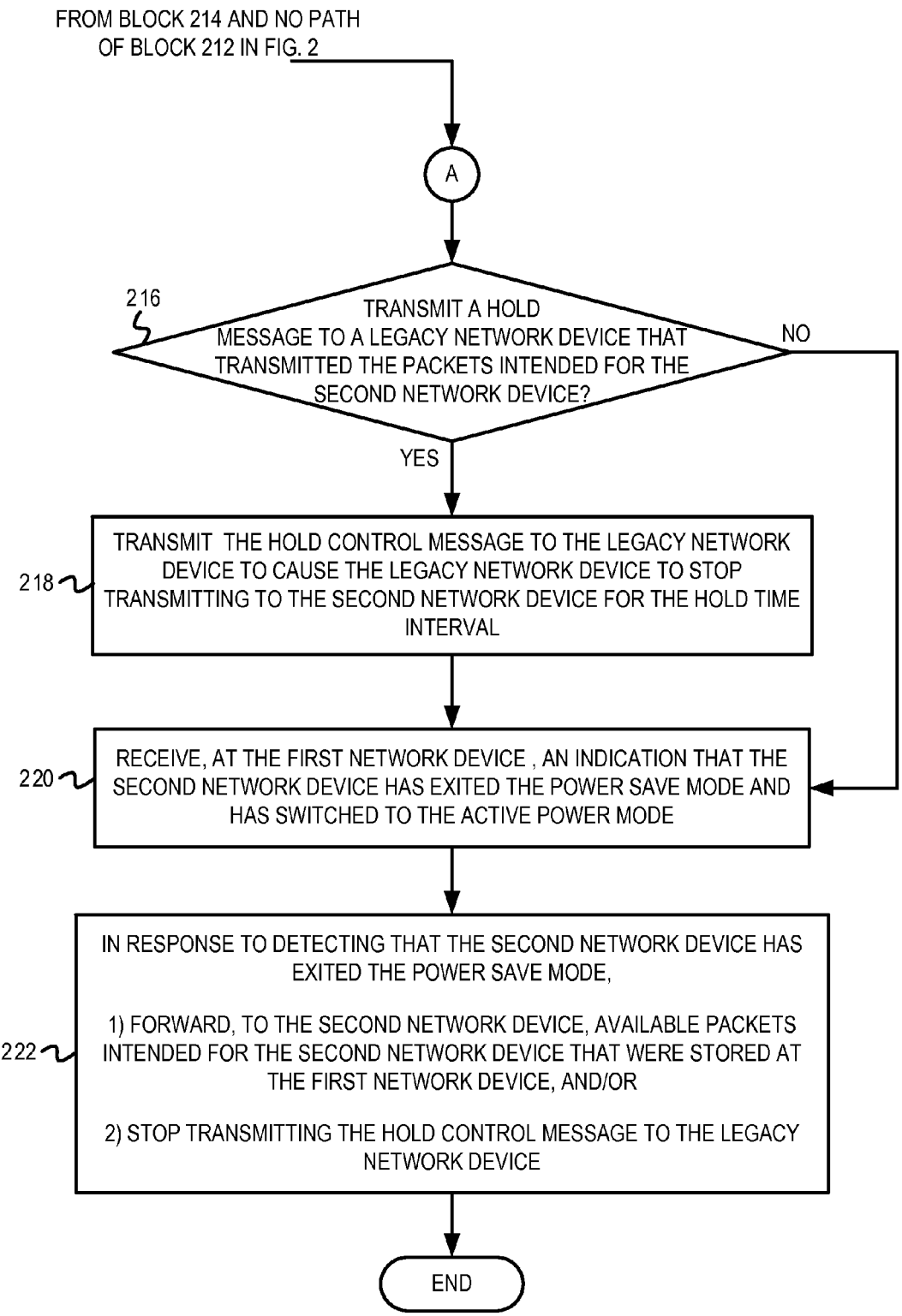
FIG. 3 is a continuation of FIG. 2 and also illustrates example operations of a power save proxy device.

FIG. 2 and FIG. 3 depict a flow diagram ("flow") 200 illustrating example operations of a power save proxy device. The flow 200 begins at block 202 in FIG. 2.

At block 202, a first network device of a communication network receives an indication that a second network device of the communication network will enter the power save mode. With reference to the example of FIG. 1, the central coordinator 104 can receive an indication that the power save PLC device 110 will switch to the power save mode. It is noted that in other implementations, one or more other suitable PLC devices (e.g., the power save PLC device 108) can receive the indication that the PLC device 110 will switch to the power save mode. As described above with reference to stage A of FIG. 1, prior to switching to the power save mode, the power save PLC device 110 can provide its device identifier, awake duration, sleep duration, a time instant at which the power save PLC device 110 will enter the power save mode, a time instant at which the power save PLC device 110 will exit the power save mode, and/or other suitable information. The flow continues at block 204.

At block 204, the first network device is configured as a proxy of the second network device. With reference to the example of FIG. 1, the central coordinator 104 can designate itself as the proxy for the power save PLC device 110 when the power save PLC device 110 enters the power save mode. In some implementations, the central coordinator 104 can designate one or more other suitable PLC devices as the power save proxy(s) for the power save PLC device 110. In some implementations, the central coordinator 104 can indicate, to other power save PLC devices in the active power mode, that it is the power save proxy for the power save PLC device 110. In other implementations, the central coordinator 104 may not indicate that it is the power save proxy for the power save PLC device 110. The flow continues at block 206.

At block 206, one or more packets intended for the second network device that is in the power save mode are detected at the first network device. For example, the central coordinator 104 can detect one or more packets (transmitted by the legacy PLC device 112) intended for the power save PLC device 110 configured in the power save mode. In some implementations, the central coordinator 104 can snoop packets transmitted via the powerline network 102 and can determine (e.g., based on reading an address field) whether the packets are intended for the power save PLC device 110 in the power save mode. In another implementation, the central coordinator 104 can continuously monitor transmissions from the legacy PLC devices 112. In response to detecting a transmission by a legacy PLC device, the central coordinator 104 can determine whether the transmission is intended for the power save PLC device 110 in the power save mode. If so, the central coordinator 104 can execute operations described below to appropriately handle the packets intended for the power save PLC device 110 in the power save mode. The flow continues at block 208.

At block 208, it is determined whether the packets intended for the second network device should be stored at the first network device. For example, in response to detecting the one or more packets intended for the PLC device 110 in the power save mode, the central coordinator 104 (e.g., the power save unit 106) can determine whether some/all/none of the packets intended for the PLC device 110 should be stored by the central coordinator 104. If it is determined that the packets intended for the second network device should be stored by the first network device, the flow continues at block 210. Otherwise, the flow continues at block 212.

At block 210, the first network device stores the packets intended for the second network device. For example, the central coordinator 104 can store the packets received from the legacy PLC device 112 and intended for the power save PLC device 110 in the power save mode, as described above with reference to stage C3 of FIG. 1. In some implementations, the central coordinator 104 can comprise one or more local storage buffers or other suitable local memory to store the packets intended for the power save PLC device 110. In another implementation, the central coordinator 104 can interface with one or more external/secondary storage devices to store the packets intended for the power save PLC device 110. The flow continues at block 212.

At block 212, the first network device determines whether to prompt the second network device to exit the power save mode. For example, the central coordinator 104 (e.g., the power save unit 106) can determine whether the power save PLC device 110 should be prompted to exit the power save mode. In some implementations, the central coordinator 104 may be configured to prompt the power save PLC device 110 to exit the power save mode whenever a packet intended for the power save PLC device 110 is detected. In another implementation, the central coordinator 104 may be configured to prompt the power save PLC device 110 to exit the power save mode only if one or more predetermined types of packets (intended for the power save PLC device 110) are detected. The central coordinator 104 can analyze the header (or packet format) of the received packet and can determine whether the received packet is one of the predetermined types of packets. If so, the central coordinator 104 can prompt the power save PLC device 110 to exit the power save mode. For example, the central coordinator 104 can prompt the power save PLC device 110 to exit the power save mode in response to detecting one or more control/management messages intended for the power save PLC device 110. In other implementations, the central coordinator 104 can prompt the power save PLC device 110 to exit the power save mode if a predetermined number of packets intended for the power save PLC device 110 were detected at the central coordinator 104. In some implementations, the central coordinator 104 may determine packet statistics such as the number of packets detected for the power save PLC device 110, attributes of the packets intended for the power save PLC device 110 (e.g., whether data or control packets, DHCP request messages, etc.). Based on the packet statistics, the central coordinator 104 can determine whether to cause the power save PLC device 110 to exit the power save mode. For example, the central coordinator 104 can determine to prompt the power save PLC device 110 to exit the power save mode if at least N packets intended for the power save PLC device 110 were detected while the power save PLC device 110 is in the power save mode. In another implementation, the central coordinator 104 can determine whether to prompt the power save PLC device 110 to exit the power save mode based on the priority of the detected packets, the legacy PLC device 112 (e.g., the priority and/or address of the legacy PLC device) that transmitted the packets, and/or other such factors. If it is determined that the first network device should prompt the second network device to exit the power save mode, the flow continues at block 214. Otherwise, the flow continues at block 216 in FIG. 3.

At block 214, a wake-up control message is transmitted to the second network device to cause the second network device to switch from the power save mode to the active power mode. For example, as described above, the central coordinator 104 (e.g., the power save unit 106) can prompt the power save PLC device 110 to exit the power save mode in response to detecting one or more packets intended for the power save PLC device 110, in response to detecting one or more predetermined types of packets intended for the power save PLC device 110, etc. In some implementations, the wake-up control message can comprise packet statistics (described above in block 212) associated with the detected packets intended for the power save PLC device 110. In other implementations, the wake-up control message can comprise a request to exit the power save mode and an indication of the legacy PLC device 112 that is attempting to communicate with the power save PLC device 110. In another implementation, the wake-up control message can simply comprise a flag bit set to a predetermined value (e.g., flag=1) that indicates that the power save PLC device 110 should exit the power save mode. It is noted that in some implementations (e.g., on the "yes" paths of blocks 208 and 210), the central coordinator 104 may store the packets intended for the power save PLC device 110 in the power save mode and may also transmit the wake-up control message to the power save PLC device 110. In other implementations, (e.g., on the "no" path of block 208 and the "yes" path of block 210), the central coordinator 104 may not capture and store the packets intended for the power save PLC device 110 in the power save mode. Instead, the central coordinator 104 can use the detection of the packets for the power save PLC device 110 as a trigger to transmit the wake-up control message. The flow then continues at block 216 in FIG. 3.

At block 216 in FIG. 3, it is determined whether a hold control message should be transmitted to the legacy network device that transmitted the packets intended for the second network device. For example, the central coordinator 104 (e.g., the power save unit 106) can determine whether to transmit the hold control message to the legacy PLC device 112. The hold control message can indicate that the legacy PLC device 112 should stop transmitting packets to the power save PLC device 110 for at least a hold time interval. If it is determined that the hold control message should be transmitted to the legacy network device, the flow continues at block 218. Otherwise, the flow continues at block 220.

At block 218, the hold control message is transmitted to the legacy network device to cause the legacy network device to stop transmitting to the second network device. In some implementations, the central coordinator 104 (e.g., the power save unit 106) can continuously transmit hold control messages to the legacy PLC device 112 for as long as the power save PLC device 110 is configured in the power save mode. The hold control message can indicate to the legacy PLC device 112 that the legacy PLC device 112 should not transmit any packets to the power save PLC device 110. In other implementations, the central coordinator 104 (e.g., the power save unit 106) can transmit the hold control message to the legacy PLC device 112 and can indicate that the legacy PLC device 112 should cease transmitting to the power save PLC device 110 for a hold time interval. The hold time interval can be determined based on the awake duration and the sleep duration of the power save PLC device 110, the time period after which the power save PLC device 110 will switch from the sleep sub-state to the awake sub-state of the power save mode, the time period after which the PLC device 110 will exit the power save mode, etc. In some implementations, the hold time interval can be dynamically calculated and may be equal to the remaining time period until the power save PLC device 110 exits the power save mode or until the power save PLC device 110 exits the sleep sub-state of the power save mode. In another implementation, the hold time interval can be a predetermined time interval determined as the amount of time required for the central coordinator 104 to transmit the wakeup control message (described above in blocks 212-214) and for the power save PLC device 110 to comply with the request and exit the power save mode. The hold time interval can be selected so that the legacy PLC device 112 restarts its transmissions to the power save PLC device 110 (e.g., retransmits the packets) when the power save PLC device 110 in the awake sub-state of the power save mode or in the active power mode. For example, the central coordinator 104 may determine that the power save PLC device 110 will exit the power save mode in 20 milliseconds. Accordingly, the central coordinator 104 can select the hold time interval to be at least 20 milliseconds. In another implementation, the hold time interval may be any suitable predetermined time interval, such as one beacon time period. In response to receiving the hold control message, the legacy PLC device 112 can set a timer to the hold time interval and can prevent transmissions to the power save PLC device 110 for the hold time interval. In some implementations, if the hold time interval is a predetermined time interval that is not tailored to the power save PLC device 110 in the power save mode, the central coordinator 104 can continue to transmit the hold control messages to the legacy PLC device 112 until the power save PLC device 110 exits the power save mode (or the sleep sub-state of the power save mode). In some implementations, as will be described below, the central coordinator 104 may transmit an acknowledgement for the packets (detected at block 206) along with the hold control message to prevent the legacy PLC device 112 from retransmitting the packets for the hold time interval. The flow continues at block 220.

At block 220, the first network device receives an indication that the second network device has exited the power save mode and has switched to the active power mode. With reference to the example of FIG. 1, the central coordinator 104 (e.g., the power save unit 106) can receive an indication that the power save PLC device 110 has exited the power save mode and switched to the active power mode. In some implementations, the central coordinator 104 can receive the indication from the power save PLC device 110 before the power save PLC device 110 switches to the active power mode. In another implementation, the central coordinator 104 can receive the indication from power save PLC device 110 after the power save PLC device 110 switches to the active power mode. In another implementation, the central coordinator 104 can automatically determine when/whether the power save PLC device 110 will switch to the active power mode. In some implementations, the central coordinator 104 may also transmit a notification to the other power save PLC devices in the powerline network 102 to indicate that the power save PLC device 110 has exited the power save mode or to indicate the time instant at which the power save PLC device 110 will exit the power save mode. The flow continues at block 222.

At block 222, in response to detecting that the second network device has exited the power save mode, the first network device forwards available packets (if any) that are intended for the second network device and that were stored at the first network device and/or stops transmitting the hold control message to the legacy network device. For example, as described above with reference to stage C3 of FIG. 1, the central coordinator can forward the packets (if any) intended for the power save PLC device 110 after the power save PLC device 110 exits the power save mode. Also, at block 222, if the power save unit 106 was configured to transmit the hold control message to the legacy PLC device 112 at block 216, the power save unit 106 can stop transmitting the hold control message to the legacy PLC device 112 after the power save PLC device 110 indicates that it has exited the power save mode. When the legacy PLC device 112 stops receiving the hold control message, this can indicate that the legacy PLC device 112 can transmit packets to the power save PLC device 110. From block 222, the flow ends.

It is noted that although FIGS. 2-3 describe operations for determining whether to store the packets received from the legacy network device, cause the power save communication device to exit the power save mode, or cause the legacy network device to temporarily stop transmitting packets, embodiments are not so limited. In other embodiments, the power save proxy (or the power save proxy bridge) can be configured to automatically store the packets, transmit the hold message, and/or transmit the wake-up control message. Furthermore, it is noted that flow 200 describe an example sequence wherein the power save proxy functionality and the power save proxy bridge functionality can be performed respectively. However, embodiments are not so limited. It is noted that in other embodiments, the sequence in which the operations of flow 200 is executed may be different. For example, one or more operations (e.g., described in blocks 208, 212, and 216) can be executed automatically. As another example, the decisions to store the packets, transmit the hold message, and/or transmit the wake-up control message can be executed in parallel. As another example, the central coordinator 104 can determine whether to store the packets intended for the PLC device 110 at block 208. If so, the central coordinator 104 can store the packets and transmit the wake-up message to the PLC device 110. Otherwise, the central coordinator 104 may not store the packets and may transmit the hold control message to the legacy PLC device 112. As another example, if it is determined not to transmit the wake-up control message at block 212, the central coordinator 104 can automatically transmit the hold control message to the legacy PLC device 112.

It should is noted that in some implementations, the legacy network device may expect to receive an acknowledgement for the packets transmitted to the power save communication device. However, the power save communication device may be unable to transmit the acknowledgement message when it is in the power save mode. To preclude the legacy network device from retransmitting the packets, consuming additional bandwidth, flooding the communication network, and/or terminating the communication link with the power save communication device, the power save proxy may transmit one or more acknowledgement messages to the legacy network device on behalf of the power save communication device. In some implementations, if the power save proxy can capture the packet and forward the packet to the power save communication device in the power save mode, the power save proxy may transmit a positive acknowledgement to the legacy network device to prevent the legacy network device from retransmitting the packet. In some implementations, the power save proxy may transmit a positive acknowledgement to the legacy network device even if the power save proxy device is unable to (or not configured to) capture and forward the packet intended for the power save communication device in the power save mode. In this implementation, the power save proxy may transmit the hold control message in addition to (or as part of) the acknowledgement message to cause the legacy network device to cease transmitting to the power save communication device for the hold time interval. For example, the acknowledgement message (transmitted to the legacy network device) can comprise one or more fields to indicate whether the legacy network device should wait before retransmitting the packet. Considering the example of a HomePlug AV communication protocol, a selective acknowledgement message can comprise a medium access control (MAC) frame stream response that can be set to "HOLD." This can indicate that the legacy network device should wait for a predetermined time interval (e.g., one beacon period or another suitable time interval) before retransmitting the packet. In some implementations, the hold control message and an indication of the hold time interval may be transmitted as part of the acknowledgement message. In some implementations, transmitting the hold control message to the legacy network device can comprise an implicit acknowledgement of the packets transmitted by the legacy network device. In some implementations, the hold time interval may not be transmitted as part of the hold control message. Instead, in response to receiving the hold control message, the legacy network device may automatically defer transmitting packets to the power save communication device for a predetermined time interval. In some implementations, the power save proxy may not transmit an acknowledgement for the packets if the hold control message is transmitted to ensure that the legacy network device retransmits the packets to the power save communication device after the hold time interval elapses.

Figure 4:
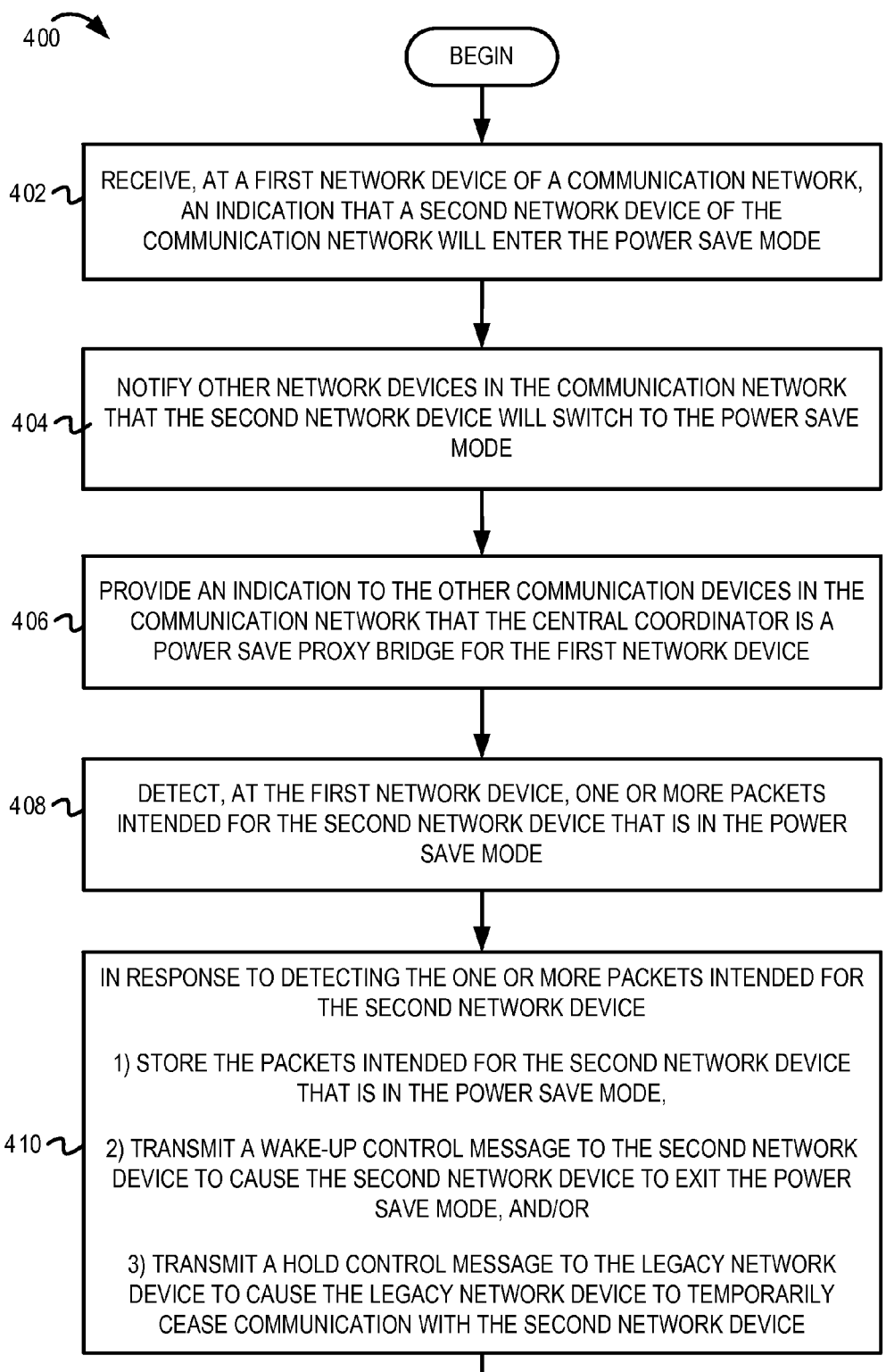
FIG. 4 is a flow diagram illustrating example operations of a power save proxy bridge device.
Figure 5:
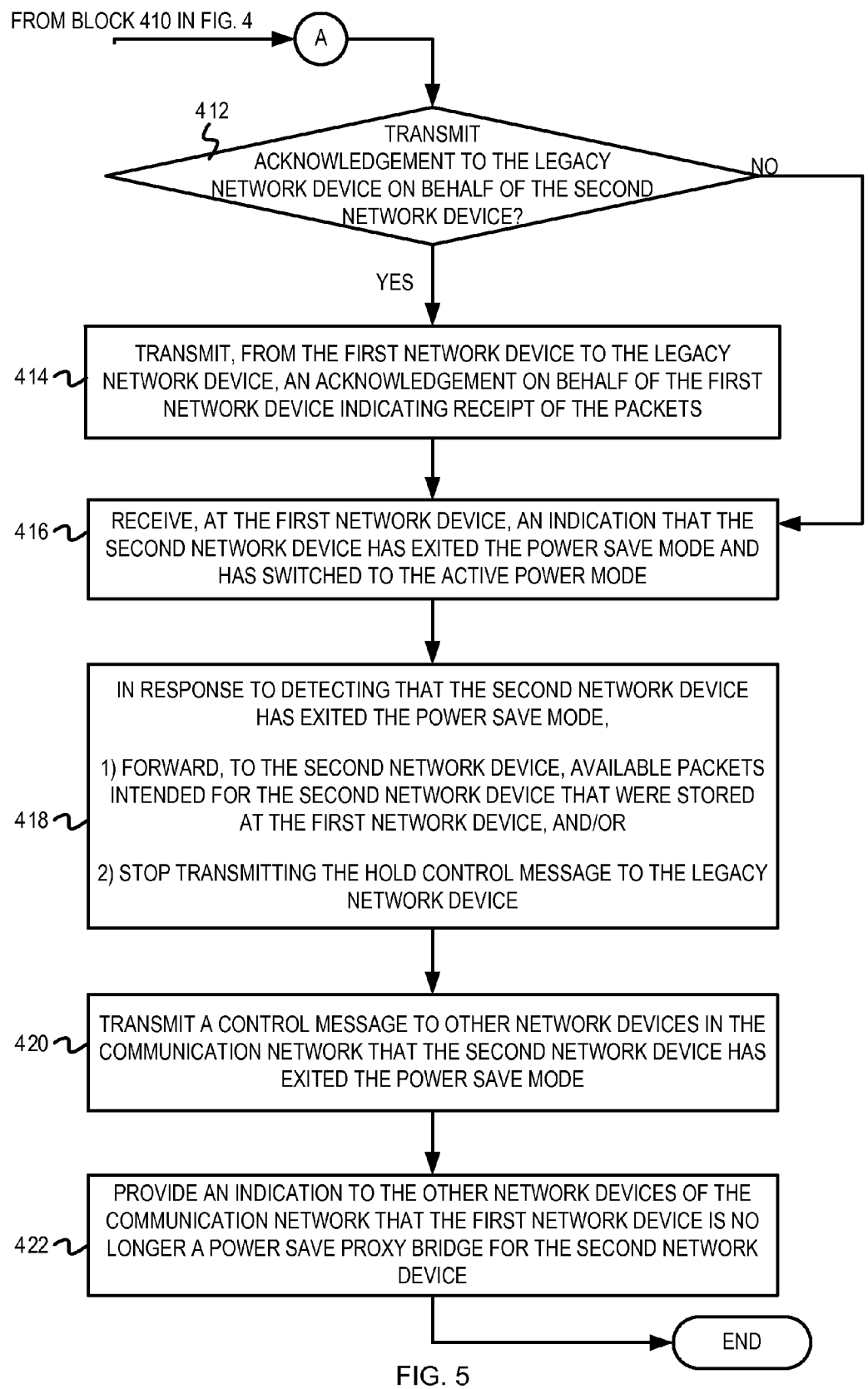
FIG. 5 is a continuation of FIG. 4 and also illustrates example operations of a power save proxy bridge device.
Figure 6:
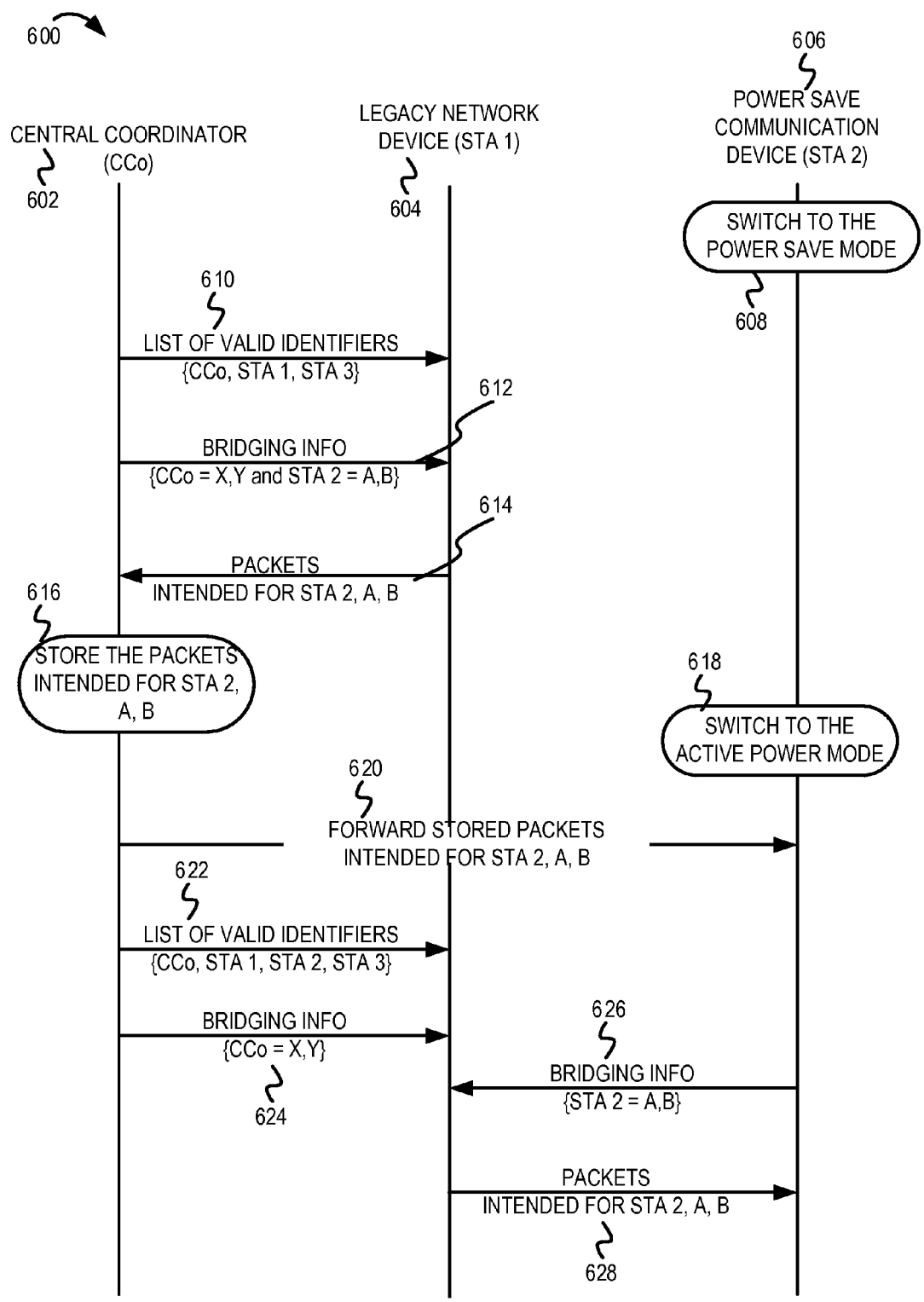
FIG. 6 is a sequence diagram illustrating example operations of a power save proxy bridge device.

FIG. 4 and FIG. 5 depict a flow diagram 400 illustrating example operations of a power save proxy bridge. The flow 400 begins at block 402 in FIG. 4. FIG. 4 and FIG. 5 will be described in conjunction with FIG. 6. FIG. 6 is a sequence diagram 600 illustrating example operations of a power save proxy bridge.

At block 402, a first network device of a communication network receives an indication that a second network device of the communication network will enter the power save mode. With reference to the example of FIG. 1, the central coordinator 104 of the powerline network 102 can receive an indication that the power save PLC device 110 will switch to the power save mode. The sequence diagram 600 of FIG. 6 depicts a central coordinator 602, a legacy network device (STAT) 604, and a power save communication device (STA 2) 606. In FIG. 6, the central coordinator 602 is a bridge to two external devices X and Y, while the power save communication device 606 is a bridge to two external devices A and B. In some implementations, the external devices A and B can belong to the same external network (e.g., the WLAN 120 of FIG. 1) while the external devices X and Y can be part of the same external network (e.g., the Ethernet 122 of FIG. 1). In other implementations, one or more of the external devices A, B, X, and Y can be part of the same of different external networks. At stage 608 of FIG. 6, the power save communication device 606 switches to the power save mode. Prior to this, the power save communication device 606 can notify the central coordinator 602 of when (and for how long) it will enter the power save mode. Referring back to FIG. 4, the flow continues at block 404.

At block 404, other network devices in the communication network are notified that the second network device will switch to the power save mode. For example, the central coordinator 104 can indicate to the power save PLC device 108 (and the legacy network device 112) that the power save PLC device 110 will switch to the power save mode. With reference to the sequence diagram 600 of FIG. 6, the central coordinator 602 can designate itself as the power save proxy for the power save communication device 606 and can indicate to the legacy network device 604 that the power save communication device 606 is no longer part of the communication network. For this, the central coordinator 602 transmits a control message 610 indicating the list of valid identifiers. As depicted in FIG. 6, the control message 610 comprises the identifiers (e.g., Terminal Equipment Identifiers or TEIs) of all the network devices that are operating in the active power mode—namely the central coordinator 602, the legacy network device (STA 1) 604, and another power save communication device STA 3 (not depicted in FIG. 6). As depicted in FIG. 6, because the power save communication device 606 is in the power save mode, the control message 610 does not comprise an identifier associated with the power save communication device 606. The flow continues at block 406.

At block 406, an indication that the first network device is a power save proxy bridge for the second network device is provided to the other network devices. With reference to FIG. 6, the central coordinator 602 transmits a control message 612 comprising suitable bridging information to the other network devices 604 of the communication network. The bridging information can identify (e.g., using MAC addresses) the bridged devices for which the central coordinator 602 will act as a network device (or a power save proxy bridge). As described above with reference to block 402, the central coordinator 602 was designated as a network bridge to external devices X and Y and the power save communication device 606 was designated as the network bridge to external devices A and B. After the power save communication device 606 switches to the power save mode, the central coordinator 602 can designate itself as the power save proxy bridge to the external network devices A and B (that were previously bridged by the power save communication device 606). In other words, while the power save communication device 606 is in the power save mode, the central coordinator 602 as act as a network bridge to the external devices A, B, X, and Y. In FIG. 6, the central coordinator 602 indicates that central coordinator 602 is the network bridge to the devices A, B, X, and Y by transmitting the network addresses of the external devices A, B, X, and Y in the control message 612. By transmitting the control message 612 to any legacy (or power save) network device in the communication network, the central coordinator 602 can indicate that any subsequent packet that is intended for the devices STA2, A, B, X, and Y should be transmitted to the central coordinator 602. In response to receiving packets that are intended for the power save communication device 606 in the power save mode (or for the external devices A and B), the central coordinator 602 can execute suitable operations, as will be further discussed below. The flow continues at block 408.

At block 408, one or more packets intended for the second network device in the power save mode are detected at the first network device. For example, the power save unit 106 can detect one or more packets intended for the power save PLC device 110 in the power save mode, as described above in stage B of FIG. 1 and in block 206 of FIG. 2. With reference to FIG. 6, the legacy network device 604 can transmit packets 614 intended for the power save communication device 606 to the central coordinator 602. The legacy network device 604 can also transmit packets 614 intended for the external network devices A and B (originally bridged by the power save communication device 606) to the central coordinator 602. The flow continues at block 410.

At block 410, in response to detecting the packets intended for the second network device, the first network device stores the packets intended for the second network device, transmits a wake-up control message to the second network device, and/or transmits a hold control message to the legacy network device. As described above with reference to stages C1-C3 of FIG. 1 and with reference to blocks 208-220 of FIGS. 2 and 3, in response to detecting the packets intended for the power save communication device 110 in the power save mode, the power save unit 106 can execute one or more suitable operations to prevent disruption of the communication link between the power save PLC device 110 and the legacy PLC device 112 or between the bridged Ethernet device 118 and the legacy PLC device 112. The central coordinator 104 can store the packets intended for the power save PLC device 110 that is in the power save mode (and/or the bridged Ethernet device 118). The central coordinator 104 can transmit the wake-up control message to the power save PLC device 110 to cause the power save PLC device 110 to exit the power save mode. The central coordinator 104 can transmit the hold control message to the legacy PLC device 112 to cause the legacy PLC device 112 to temporarily stop transmitting packets to the power save PLC device 110 (and/or the bridged Ethernet device 118). In some implementations, as described above, the central coordinator 102 can execute one or more of the above-described operations in response to detecting the packets intended for the power save PLC device 110. With reference to FIG. 6, the central coordinator 602 is configured to store (at stage 616) the packets intended for the power save communication device 606 and the external network devices A and B. From block 410 in FIG. 4, the flow continues at block 412 in FIG. 5.

At block 412, it is determined whether an acknowledgement should be transmitted to the legacy network device on behalf of the second network device. For example, the central coordinator 104 (e.g., the power save unit 106) can determine whether to transmit an acknowledgment message to the legacy PLC device 112 to indicate receipt of the packets detected at block 408. If it is determined that the acknowledgement message should be transmitted to the legacy network device, the flow continues at block 414. Otherwise, the flow continues at block 416.

At block 414, the acknowledgment message indicating receipt of the packets is transmitted to the legacy network device on behalf of the first network device. For example, the central coordinator 104 can transmit the acknowledgement message to the legacy PLC device 112 to indicate receipt of the packets intended for the power save PLC device 110 in the power save mode. The central coordinator 104 can also transmit the acknowledgement message to the legacy PLC device 112 to indicate receipt of the packets intended for the external Ethernet device 118 to which the central coordinator 104 is a power save proxy bridge. In some implementations, as described above, the acknowledgment message can be transmitted to the legacy PLC device 112 to prevent retransmission of the packets by the legacy PLC device 112. In some implementations, as described above, the acknowledgment message can also be accompanied by the hold control message to prevent retransmission of the packets by the legacy PLC device 112 for a specified hold time interval. The flow continues at block 416.

At block 416, the first network device receives an indication that the second network device has exited the power save mode and has switched to the active power mode. Referring to FIG. 6, the power save communication device 606 exits the power save mode and switches to the active power mode at stage 618. The power save communication device 606 can notify the central coordinator 602 after the power save communication device 606 exits the power save mode. Referring back to FIG. 5, the flow continues at block 418.

At block 418, in response to detecting that the second network device has exited the power save mode, the first network device forwards available packets (if any) that are intended for the second network device and that were stored at the first network device and/or stops transmitting the hold control message to the legacy network device. For example, the central coordinator 104 can forward the packets (if any) intended for the power save PLC device 110 after the power save PLC device 110 exits the power save mode, as described above in stage C3 of FIG. 1 and block 222 of FIG. 3. With reference to FIG. 6, after the power save communication device 606 exits the power save mode at stage 618, the central coordinator 602 forwards the packets 620 received from the legacy network device 604 for the power save communication device 606 and for the bridged external network devices A and B. Also, as described above with reference to block 222 in FIG. 3, if the central coordinator 104 transmitted the hold control message to the legacy PLC device 112 at block 410, the central coordinator 104 can stop transmitting the hold control message to the legacy PLC device 112 after the power save PLC device 110 indicates that it has exited the power save mode. From block 418, the flow continues at block 420.

At block 420, a control message is transmitted to the other network devices in the communication network to indicate that the second network device has exited the power save mode. For example, the power save unit 106 of the central coordinator 104 can indicate to the PLC devices 108 and 112 that the power save PLC device 110 has exited the power save mode and is now operating in the active power mode. With reference to the sequence diagram 600 of FIG. 6, the central coordinator 602 indicates to the legacy network device 604 that the power save communication device 606 is part of the communication network. For this, the central coordinator 602 transmits a control message 622 comprising a list of valid device identifiers. As depicted in FIG. 6, the control message 622 comprises the identifiers (e.g., TEIs) of all the network devices that are operating in the active power mode—namely the central coordinator 602, the legacy network device (STA 1) 604, the power save communication device (STA 2) 606, and network device STA 3 (not depicted in FIG. 6). As depicted in FIG. 6, because the power save communication device 606 has exited the power save mode, the control message 622 comprises the device identifier associated with the power save communication device 606. The flow continues at block 422.

At block 422, an indication that the first network device is no longer a power save proxy bridge for the second network device is provided to other network devices of the communication network. With reference to FIG. 6, the central coordinator 602 transmits a control message 624 identifying the external network devices to which the central coordinator 602 will act as a network bridge. Because the power save communication device 606 is operating in the active power mode and because the central coordinator 602 is not a power save proxy bridge for the power save communication device 606, the control message 624 indicates that the central coordinator 602 will only be a network bridge to the external network devices X and Y. By transmitting the control message 624 to at least the legacy network device 604, the central coordinator 602 can indicate that only packets intended for the external network devices X and Y should be transmitted to the central coordinator 602. Furthermore, as depicted in FIG. 6, the power save communication device 606 also transmits a control message 626 to the legacy network device 604 to indicate that the power save communication device 606 will be a network bridge to the external network devices A and B. By transmitting the control message 626 to the legacy network device 604, the power save communication device 606 can indicate that any subsequent packet that is intended for the external network devices A and B should be transmitted to the power save communication device 606. As further depicted in FIG. 6, the legacy network device 604 transmits packets 626 intended for the power save communication device 606 and for the external network devices A and B to the power save communication device 606. From block 422, the flow ends.

It is noted that although FIGS. 4-6 describe operations for determining whether to store the packets received from the legacy network device, whether to cause the power save communication device to exit the power save mode, or whether to cause the legacy network device to temporarily stop transmitting packets, embodiments are not so limited. In other embodiments, functionality can be implemented to automatically store the packets, transmit the hold message, and/or transmit the wake-up control message. Furthermore, the sequence in which the operations of flow 400 is executed may be different. For example, the decisions to store the packets, transmit the hold message, and/or transmit the wake-up control message can be executed in parallel.

It should be understood that FIGS. 1-6 are examples meant to aid in understanding embodiments and should not be used to limit embodiments or limit scope of the claims. Embodiments may perform additional operations, fewer operations, operations in a different order, operations in parallel, and some operations differently. For example, in some implementations, the functionality of the power save proxy and the functionality of a power save proxy bridge may be distinct as described above in FIGS. 2-3 (power save proxy) and FIGS. 4-5 (power save proxy bridge) and may be provided by distinct power save PLC devices. In other implementations, the power save proxy functionality and the power save proxy bridge functionality may be integrated and may be provided by the same power save PLC device.

Although the Figures depict the power save PLC device 110 notifying the central coordinator (and/or other power save PLC devices in the powerline network 102) that it will switch to the power save mode, embodiments are not so limited. In other embodiments, the power save PLC device 110 may request permission (e.g., from the central coordinator 104) for switching to the power save mode. For example, the power save PLC device 110 may query the central coordinator 104 to determine whether one or more packets intended for the power save PLC device 110 are available (at the central coordinator 104). If there are no packets intended for the power save PLC device 110, the power save PLC device can notify the central coordinator 104 that it (i.e., the power save PLC device 110) will switch to the power save mode. As another example, the power save PLC device 110 may request permission (e.g., from the central coordinator 104) for switching to the power save mode. The central coordinator 104 may determine whether packets are available for the power save PLC device 110. If no packets are available for the power save PLC device 110, the central coordinator 104 may grant the power save PLC device 110 permission to enter the power save mode.

In some embodiments, the power save proxy functionality may be provided (e.g., for a power save PLC device) only when the power save PLC device switches to the sleep sub-state of the power save mode. In other embodiments, the power save proxy functionality may be provided when the power save PLC device is configured in the power save mode—irrespective of whether the power save PLC device is in the awake sub-state or the sleep sub-state of the power save mode. For example, the central coordinator 104 may designate itself as the power save proxy for the power save PLC device 110 when the PLC device 110 enters the sleep sub-state of the power save mode and may release itself as the power save proxy when the power save PLC device 110 switches to the awake sub-state of the power save mode (or when the power save PLC device 110 exits the power save mode). As another example, the central coordinator 104 may designate itself as the power save proxy for the power save PLC device 110 when the PLC device 110 enters the power save mode and may release itself as the power save proxy only after the power save PLC device 110 exits the power save mode. In some implementations, whether the power save proxy functionality is provided only during the sleep sub-state of the power save mode or for the entire duration of the power save mode can depend on the sleep duration and the awake duration of the power save PLC device 110. For example, if the awake duration and sleep duration are large (e.g., if the awake duration is 5 seconds and the sleep duration is 100 seconds), the power save proxy functionality may be provided only during the sleep sub-state of the power save mode. As another example, if the awake duration is much shorter than the sleep duration (e.g., if the awake duration is 100 milliseconds and the sleep duration is 100 seconds), the power save proxy functionality may be provided for the entire duration of the power save mode.

Although FIG. 1 depicts the central coordinator 104 (or another master communication device) implementing the power save proxy functionality to enable communication between the legacy PLC device 112 and the power save PLC device 110 in the power save mode, embodiments are not so limited. In other embodiments, another suitable power save PLC device operating in the active power mode can implement the power save proxy functionality. For example, the central coordinator 104 can designate the power save PLC device 108 as the power save proxy. In some implementations, the powerline network 102 may not comprise a central coordinator 104 (or another master communication device). In these implementations, in response to determining that the power save PLC device 110 will enter the power save mode, one or more of the other power save PLC devices can automatically designate themselves as the power save proxy. In some implementations, different power save proxies can be used for different legacy PLC devices. For example, in response to determining that a first power save PLC device will switch to the power save mode, a second and a third power save PLC device can both act as proxies for the first power save PLC device. The second power save PLC device can act as a proxy (e.g., detect messages, provide acknowledgement messages, etc.) when a first subset of legacy PLC devices attempt to communicate with the first power save PLC device in the power save mode. The third power save PLC device can act as a proxy (e.g., detect messages, provide acknowledgement messages, etc.) when a second subset of legacy PLC devices attempt to communicate with the first power save PLC device in the power save mode. In some implementations, multiple power save PLC devices in the powerline network can coordinate amongst each other to provide the power save proxy functionality. In some implementations, the power save PLC devices may operate in the active power mode while providing the power save proxy functionality. In other implementations, the power save PLC devices may also operate in the awake sub-state of the power save mode while providing the power save proxy functionality. In other words, any suitable number of power save PLC devices (i.e., power save PLC devices) that are not configured in the sleep sub-state of the power save mode may be designated as power save proxies.

Although FIG. 2 describes the central coordinator 104 determining that a packet from a legacy PLC device 112 is intended for the power save PLC device 110 in the power save mode and transmitting the wake-up control message to that power save PLC device 110, embodiments are not so limited. In other embodiments, in response to detecting a packet transmitted by the legacy PLC device 112, the central coordinator 104 can transmit the wake-up control message (e.g., multiple unicast messages, a single multicast message, etc.) to all the power save PLC devices that are in the power save mode. In other words, the central coordinator 104 can use the detection of the packets from the legacy PLC device 112 to the power save PLC device 110 as a trigger to prompt all the power save PLC devices in the power save mode to exit the power save mode.

In some embodiments, the central coordinator 104 can determine the packet statistics associated with the detected packets intended for the power save PLC device 110 in the power save mode (as described above in block 212 of FIG. 2). The central coordinator 104 can forward the packet statistics to the power save PLC device 110 in the power save mode. The power save PLC device 110 can analyze the packet statistics and can determine whether to remain in the power save mode or whether to exit the power save mode. In some implementations, the central coordinator 104 may temporarily store the packets intended for the power save PLC device 110 in the power save mode, and may use the packet statistics to prompt (or to determine whether to prompt) the PLC device 110 to exit the power save mode. The central coordinator 104 may or may not forward those stored packets to the PLC device 110 after the PLC device 110 exits the power save mode.

It is noted that in some implementations, the powerline network 102 of FIG. 1 can be a HomePlug AV network. In the HomePlug AV network, each PLC device can be identified by a unique Terminal Equipment Identifier (TEI) that is assigned to the PLC devices by the master of the powerline network 102 (e.g., the central coordinator 104). Typically, transmissions in the HomePlug AV network comprise frame control fields followed by a payload field. The frame control fields can be transmitted in broadcast mode and may be detected/deciphered by any PLC device (e.g., power save HomePlug AV device) in the HomePlug AV network. The frame control fields can comprise the TEI of the destination PLC device (DTEI) for which the packet is intended, the type of transmission, and the TEI of the source PLC device (STEI) that initiated the transmission. Any of the power save PLC devices in the HomePlug AV network can determine the source PLC device and the destination PLC device by reading the STEI and the DTEI values in the frame control fields. Moreover, the central coordinator 104 can periodically broadcast a list of current valid TEIs. The current valid TEIs can correspond to those power save PLC devices that are in the active power mode (i.e., those that are not in the power save mode). Furthermore, it is noted that the HomePlug AV protocol can support selective acknowledgement and bridging. Therefore, the power save proxy bridge functionality described herein can also be provided in the HomePlug AV network. As described above, the packets intended for the bridged network devices (e.g., of another communication network) can be routed by the power save PLC device that is designated as the power save proxy bridge.

In some implementations in the HomePlug AV network, a PLC device can communicate with another PLC device using a unique tonemap. The tonemap can indicate the modulation of each carrier used for communication, guard time intervals, coding rate, etc. During normal operation, tonemaps can be exchanged between (and agreed upon by) the two PLC devices. The tonemaps may be unique to the two PLC devices and may be used for decoding the payload of unicast communications exchanged between the two PLC devices. In other words, other PLC devices may not be able to decode a transmission (exchanged between the two PLC devices) unless the other PLC devices have the tonemap that was used for that transmission. In some implementations, a PLC device may provide its tonemap to its power save proxy prior to entering the power save mode. This can enable the power save proxy to decode unicast transmissions intended for the PLC device in the power save mode. With reference to FIG. 1, before the power save PLC device 110 enters the power save mode, the power save PLC device 110 can provide the tonemap (e.g., used by the PLC device 110 and the legacy PLC device 112 for communicating) to the central coordinator 104. When the legacy PLC device 112 attempts to communicate with the power save PLC device 110, the central coordinator 104 can detect and decode the transmissions and (in one embodiment) can locally store the information/data received in the transmissions. When the power save PLC device 110 exits the power save mode, the central coordinator 104 can forward the stored information to the power save PLC device 110.

Embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments of the inventive subject matter may take the form of a computer program product embodied in any tangible medium of expression having computer usable program code embodied in the medium. The described embodiments may be provided as a computer program product, or software, that may include a machine-readable medium having stored thereon instructions, which may be used to program a computer system (or other electronic device(s)) to perform a process according to embodiments, whether presently described or not, since every conceivable variation is not enumerated herein. A machine-readable medium includes any mechanism for storing or transmitting information in a form (e.g., software, processing application) readable by a machine (e.g., a computer). A machine-readable medium may be a machine-readable storage medium, or a machine-readable signal medium. A machine-readable storage medium may include, for example, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of tangible medium suitable for storing electronic instructions (e.g., executable by one or more processors). A machine-readable signal medium may include a propagated data signal with computer readable program code embodied therein, for example, an electrical, optical, acoustical, or other form of propagated signal (e.g., carrier waves, infrared signals, digital signals, etc.). Program code embodied on a machine-readable signal medium may be transmitted using any suitable medium, including, but not limited to, wireline, wireless, optical fiber cable, RF, or other communications medium.

Computer program code for carrying out operations of the embodiments may be written in any combination of one or more programming languages, including an object oriented programming language such as Java, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN), a personal area network (PAN), or a wide area network (WAN), or the connection may be made to an external computer (for example, through the Internet using an Internet Service Provider).

Figure 7:
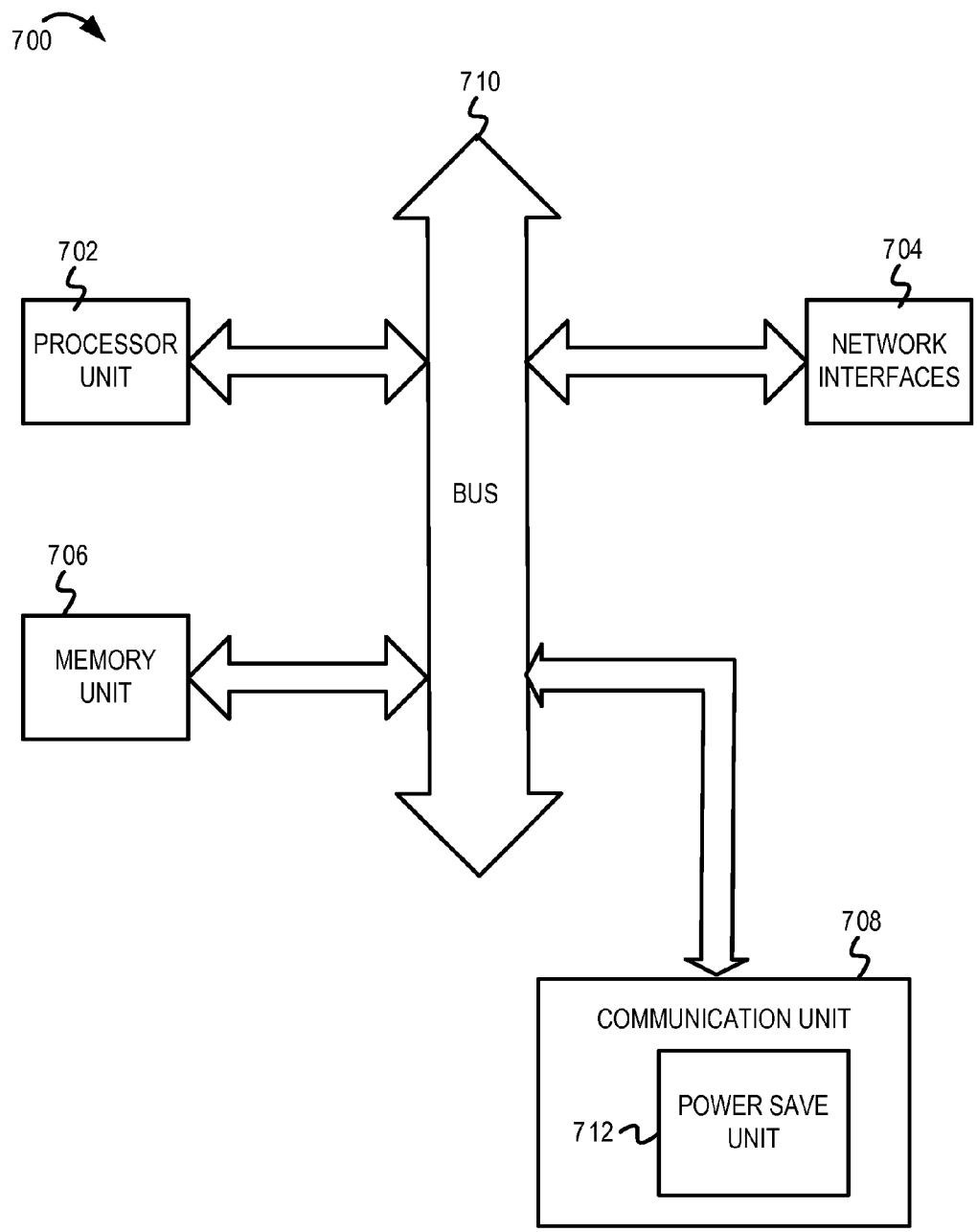
FIG. 7 is a block diagram of one embodiment of an electronic device including a power save proxy and a power save proxy bridge mechanism.

FIG. 7 is a block diagram of one embodiment of an electronic device 700 including a power save proxy and a power save proxy bridge mechanism. In some implementations, the electronic device 700 may be one of a desktop computer, laptop computer, a tablet computer, a mobile phone, a smart appliance, a powerline communication device, a gaming console, network bridge devices, or other electronic systems comprising a communication unit configured to communicate across one or more multiple communication networks. The electronic device 700 includes a processor unit 702 (possibly including multiple processors, multiple cores, multiple nodes, and/or implementing multi-threading, etc.). The electronic device 700 includes a memory unit 706. The memory unit 706 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The electronic device 700 also includes a bus 710 (e.g., PCI, ISA, PCI-Express, HyperTransport®, InfiniBand®, NuBus, AHB, AXI, etc.), and network interfaces 704 that include at least one of a wireless network interface (e.g., a WLAN interface, a Bluetooth® interface, a WiMAX interface, a ZigBee® interface, a Wireless USB interface, etc.) and a wired network interface (e.g., a powerline communication interface, an Ethernet interface, etc.). In some implementations, the electronic device 700 can comprise a plurality of network interfaces—each of which couples the electronic device 700 to a different communication network. For example, the electronic device 700 can comprise a powerline communication interface, an Ethernet interface, and a WLAN interface that couple the electronic device 700 with a powerline network, Ethernet, and a wireless local area network respectively.

The electronic device 700 also includes a communication unit 708. The communication unit 708 comprises a power save unit 712. In some instances, the electronic device 700 can operate as a power save proxy for another electronic device configured in a power save mode, as described above with reference to FIGS. 1-3. In other instances, the electronic device 600 can operate as a power save proxy bridge to one or more external network devices while another electronic device that was originally designated as the network bridge is configured in the power save mode, as described above in FIGS. 1 and 4-6. Any one of these functionalities may be partially (or entirely) implemented in hardware and/or on the processor unit 702. For example, the functionality may be implemented with an application specific integrated circuit, in logic implemented in the processor unit 702, in a co-processor on a peripheral device or card, etc. Further, realizations may include fewer or additional components not illustrated in FIG. 7 (e.g., video cards, audio cards, additional network interfaces, peripheral devices, etc.). The processor unit 702, the memory unit 706, and the network interfaces 704 are coupled to the bus 710. Although illustrated as being coupled to the bus 710, the memory unit 706 may be coupled to the processor unit 702.

While the embodiments are described with reference to various implementations and exploitations, it will be understood that these embodiments are illustrative and that the scope of the inventive subject matter is not limited to them. In general, techniques for implementing a power save proxy in communication networks as described herein may be implemented with facilities consistent with any hardware system or hardware systems. Many variations, modifications, additions, and improvements are possible.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method comprising:
    determining, at a first communication device, a future time when a second communication device of a communication network is scheduled to switch to a power save mode;
    determining that the first communication device is designated as a power save proxy for the second communication device while the second communication device is in the power save mode;
    generating, at the first communication device, a first notification indicating the future time when the second communication device is scheduled to switch to the power save mode;
    transmitting the first notification from the first communication device to a third communication device;
    detecting, at the first communication device, a packet transmitted from the third communication device and intended for the second communication device while the second communication device is in the power save mode and after the first notification was transmitted to the third communication device, wherein the third communication device does not support the power save mode; and
    transmitting a first control message from the first communication device to the second communication device that requests the second communication device to exit the power save mode to allow the second communication device to receive one or more subsequent packets from the third communication device, in response to said detecting the packet.

2. The method of claim 1 further comprising:
    determining, at the first communication device, when the second communication device will be in a sleep sub-state of the power save mode; and
    wherein said detecting the packet comprises detecting the packet while the second communication device is in the sleep sub-state.

3. The method of claim 1, wherein said determining the future time comprises:
    receiving, at the first communication device, a second notification from the second communication device indicating the future time
        the first notification comprises a schedule that is generated based, at least in part, on the second notification.

4. The method of claim 1, wherein said detecting the packet comprises:
    monitoring, at the first communication device, a plurality of transmissions from the third communication device; and
    determining, at the first communication device, that a first of the plurality of transmissions from the third communication device is intended for the second communication device in the power save mode.

5. The method of claim 1, further comprising:
storing, at the first communication device, the packet; and
forwarding the packet from the first communication device to the second communication device after the second communication device exits the power save mode.

6. The method of claim 5, wherein said forwarding the packet comprises:
determining, at the first communication device, when the second communication device exits a sleep sub-state of the power save mode; and
forwarding the packet after the second communication device exits the sleep sub-state.

7. The method of claim 1, further comprising:
determining, at the first communication device, packet statistics based, at least in part, on a type of the packet; and
providing the packet statistics in the first control message.

8. The method of claim 1, further comprising:
determining, at the first communication device, whether to transmit the first control message based, at least in part, on at least one member selected from the group consisting of a type associated with the packet, a priority associated with the packet, and a type of the third communication device.

9. The method of claim 1, further comprising:
transmitting an acknowledgement message from the first communication device to the third communication device that indicates that the second communication device received the packet and that indicates the third communication device should not retransmit the packet to the second communication device, wherein said transmitting the acknowledgement message is in response to said detecting the packet.

10. The method of claim 1, further comprising:
transmitting a second control message including a time interval from the first communication device to the third communication device, the second control message requesting the third communication device to cease transmitting to the second communication device for at least the time interval.

11. The method of claim 1, further comprising:
determining that the first communication device is designated as a power save proxy bridge to the second communication device; and
transmitting a second control message from the first communication device to the third communication device that indicates the first communication device is the power save proxy bridge.

12. The method of claim 11, further comprising:
determining, at the first communication device, that the second communication device has exited the power save mode; and
transmitting a third control message from the first communication device to the third communication device, the third control message indicating that the third communication device is to transmit the one or more subsequent packets intended for the second communication device to the second communication device since the first communication device is no longer the power save proxy bridge to the second communication device.

13. The method of claim 1, in response to said determining the future time, further comprising:
determining that the first communication device is designated as a power save proxy bridge to the second communication device and a fourth communication device while the second communication device is in the power save mode; and transmitting a second control message from the first communication device to the third communication device that indicates the third communication device is to transmit the one or more subsequent packets intended for the second communication device and the fourth communication device to the first communication device.

14. The method of claim 1, wherein the first communication device, the second communication device, and the third communication device are configured to communicate via at least one member selected from the group consisting of a powerline communication network, an Ethernet, and a wireless local area network.

15. The method of claim 1, wherein
the future time comprises at least one member selected from the group consisting of a time instant when the second communication device is scheduled to switch to the power save mode and a time interval after which the second communication device is scheduled to switch to the power save mode.

16. The method of claim 1, wherein said determining the future time comprises:
receiving, at the first communication device, a second notification from the second communication device indicating a time interval after which the second communication device is scheduled to switch to the power save mode, wherein
the first notification comprises a schedule that is generated based, at least in part, on the second notification, and
the schedule indicates the future time.

17. A method comprising:
determining, at a first communication device, when a second communication device of a communication network will be in a power save mode;
determining, at the first communication device, a future time when the second communication device is scheduled to switch to a sleep sub-state of the power save mode;
determining, at the first communication device, to operate as a power save proxy for the second communication device while the second communication device is in the power save mode;
generating, at the first communication device, a first notification indicating the future time when the second communication device is scheduled to switch to the sleep sub-state;
transmitting the first notification from the first communication device to a third communication device;
detecting, at the first communication device, a packet transmitted from the third communication device and intended for the second communication device while the second communication device is in the sleep sub-state and after the first notification was transmitted to the third communication device; and
transmitting a first control message from the first communication device to the third communication device that requests the third communication device to stop transmitting packets to the second communication device while the second communication device is in the sleep sub-state, in response to said detecting the packet.

18. The method of claim 17, wherein said determining the future time comprises, receiving, at the first communication device, a second notification from the second communication device indicating the future time, wherein
the first notification comprises a schedule that is generated based, at least in part, on the second notification, the schedule indicates when the second communication device will be in the power save mode, and the schedule further indicates the future time when the second communication device is scheduled to switch to the sleep sub-state and a time when the second communication device is scheduled to exit the sleep sub-state and switch to an awake sub-state of the power save mode.

19. The method of claim 17, wherein said detecting the packet comprises:

monitoring, at the first communication device, a plurality of transmissions from the third communication device; and determining, at the first communication device, that a first of the plurality of transmissions is intended for the second communication device in the sleep sub-state.

20. The method of claim 17, further comprising:

transmitting, from the first communication device, an acknowledgement message to the third communication device that indicates the second communication device received the packet.

21. The method of claim 17, further comprising:

determining, at the first communication device, a first time interval for which the third communication device should stop transmitting packets to the second communication device; and providing an indication of the first time interval in the first control message, wherein the first time interval is at least one member selected from the group consisting of:
 a predetermined time interval,
 a second time interval based, at least in part, on a first time period after which the second communication device will exit the sleep sub-state, and
 a third time interval based, at least in part, on a second time period after which the second communication device will exit the power save mode.

22. The method of claim 17, further comprising:

transmitting one or more subsequent control messages to the third communication device while the second communication device is in the sleep sub-state, wherein each of the one or more subsequent control messages requests the third communication device to stop transmitting packets to the second communication device for a time interval; and stopping transmission of the one or more subsequent control messages after the second communication device exits the sleep sub-state.

23. The method of claim 17, further comprising:

storing, at the first communication device, the packet; and forwarding the packet from the first communication device to the second communication device after the second communication device exits the sleep sub-state and switches to an awake sub-state of the power save mode, or after the second communication device exits the power save mode.

24. The method of claim 17, further comprising:

determining, at the first communication device, whether to transmit a second control message to the second communication device that requests the second communication device to exit the sleep sub-state based on at least one member selected from the group consisting of a type associated with the packet, a priority associated with the packet, and a type of the third communication device.

25. The method of claim 17, further comprising:

determining, at the first communication device, packet statistics based, at least in part, on a type of the packet; and transmitting a second control message including the packet statistics to the second communication device, the second control message requesting the second communication device to exit the sleep sub-state.

26. The method of claim 17, further comprising:

determining that the first communication device is designated as a power save proxy bridge to the second communication device while the second communication device is in the sleep sub-state; and transmitting a second control message from the first communication device to the third communication device, the second control message indicating the third communication device is to transmit subsequent packets intended for the second communication device to the first communication device since the first communication device is designated as the power save proxy bridge.

27. The method of claim 17, wherein the first communication device, the second communication device, and the third communication device are configured to communicate via at least one member selected from the group consisting of a powerline communication network, an Ethernet, and a wireless local area network.

28. The method of claim 17, wherein said determining the future time comprises, receiving, at the first communication device, a second notification from the second communication device indicating a time interval after which the second communication device is scheduled to switch to the sleep sub-state, wherein the first notification comprises a schedule that is generated based, at least in part, on the second notification, the schedule indicates when the second communication device will be in the power save mode, and the schedule further indicates the future time when the second communication device is scheduled to exit the sleep sub-state and switch to an awake sub-state of the power save mode.

29. A first communication device comprising:

a network interface; and a power save unit coupled with the network interface, the power save unit to:

determine a future time when a second communication device of a communication network is scheduled to switch to a power save mode;

determine that the first communication device is designated as a power save proxy for the second communication device while the second communication device is in the power save mode;

generate a notification indicating the future time when the second communication device is scheduled to switch to the power save mode;

transmit the notification from the first communication device to a third communication device;

detect a packet that is transmitted from the third communication device and intended for the second communication device while the second communication device is in the power save mode and after the notification was transmitted to the third communication device, wherein the third communication device does not support the power save mode; and transmit a first control message to the second communication device to request the second communication device to exit the power save mode to allow the second communication device to receive one or more subsequent packets from the third communication device, in response to the power save unit detecting the packet.

30. The first communication device of claim 29, wherein the power save unit is further to:
   determine when the second communication device will be in a sleep sub-state of the power save mode;
      wherein the power save unit to detect the packet comprises the power save unit to detect the packet while the second communication device is in the sleep sub-state.
31. The first communication device of claim 29, wherein the power save unit is further to:
   store the packet; and
   forward the packet to the second communication device after the second communication device exits the power save mode or when the second communication device exits a sleep sub-state of the power save mode.
32. The first communication device of claim 29, wherein the power save unit is further to:
   determine packet statistics based, at least in part, on a type of the packet; and
   provide the packet statistics in the first control message.
33. The first communication device of claim 29, wherein the power save unit is further to:
   transmit an acknowledgement message to the third communication device that indicates the second communication device received the packet and the third communication device is not to retransmit the packet to the second communication device, wherein the power save unit is to transmit the acknowledgement message in response to the power save unit detecting the packet.
34. The first communication device of claim 29, wherein the power save unit is further to:
   transmit a second control message including a first time interval to the third communication device that requests the third communication device to cease transmitting to the second communication device for at least the first time interval, or
   transmit one or more subsequent control messages to the third communication device while the second communication device is in the power save mode, wherein
      each of the one or more subsequent control messages requests the third communication device to stop transmitting packets to the second communication device for at least a second time interval.
35. The first communication device of claim 29, wherein the power save unit to determine that the first communication device is designated as the power save proxy for the second communication device comprises the power save unit to:
   determine that the first communication device is designated as a power save proxy bridge to the second communication device while the second communication device is in the power save mode; and
   transmit a second control message to the third communication device that indicates the third communication device is to transmit the one or more subsequent packets intended for the second communication device to the first communication device since the first communication device is designated as the power save proxy bridge to the second communication device.
36. A first communication device comprising:
   a network interface; and
   a power save unit coupled with the network interface, the power save unit to:
      determine when a second communication device of a communication network will be in a power save mode;
      determine a future time when the second communication device is scheduled to switch to a sleep sub-state of the power save mode;
      determine that the first communication device is designated as a power save proxy for the second communication device while the second communication device is in the power save mode;
      generate a notification indicating the future time when the second communication device is scheduled to switch to the sleep sub-state;
      transmit the notification from the first communication device to a third communication device;
      detect a packet transmitted from the third communication device to the second communication device and intended for the second communication device while the second communication device is in the sleep sub-state and after the notification was transmitted to the third communication device; and
      transmit a first control message to the third communication device that requests the third communication device to stop transmitting packets to the second communication device while the second communication device is in the sleep sub-state, in response to the power save unit detecting the packet.
37. The first communication device of claim 36, further comprising the power save unit to:
   transmit an acknowledgement message to the third communication device that indicates the second communication device received the packet.
38. The first communication device of claim 36, further comprising the power save unit to:
   provide an indication of a first time interval in the first control message, the first time interval indicating a time period for which the third communication device should stop transmitting packets to the second communication device; or
   transmit one or more subsequent control messages to the third communication device while the second communication device is in the sleep sub-state, wherein
      each of the one or more subsequent control messages requests the third communication device to stop transmitting packets to the second communication device for a second time interval.
39. The first communication device of claim 36, wherein the power save unit is further to:
   store the packet; and
   forward the packet to the second communication device after the second communication device exits the sleep sub-state and switches to an awake sub-state of the power save mode, or after the second communication device exits the power save mode.
40. The first communication device of claim 36, wherein the power save unit is further to:
   determine whether to transmit a second control message to the second communication device that requests the second communication device to exit the sleep sub-state based on at least one member selected from the group consisting of a type associated with the packet, a priority associated with the packet, and a type of the third communication device.
41. The first communication device of claim 36,
   wherein the power save unit to determine that the first communication device is designated as the power save proxy for the second communication device comprises the power save unit to:
      determine that the first communication device is designated as a power save proxy bridge to the second communication device while the second communication device is in the sleep sub-state; and wherein the power save unit is further to transmit a second control message to the third communication device that indicates the third communication device is to transmit subsequent packets intended for the second communication device to the first communication device since the first communication device is the power save proxy bridge.

* * * * *